United States Patent
Desai et al.

(10) Patent No.: US 10,691,872 B2
(45) Date of Patent: Jun. 23, 2020

(54) NORMALIZING MESSAGE STYLE WHILE PRESERVING INTENT

(71) Applicant: Microsoft Corporation, Redmond, WA (US)

(72) Inventors: Aditi Desai, Redmond, WA (US); Malia M. Douglas, Seattle, WA (US); David De La Brena Valderrama, Bellevue, WA (US); Mark Sunderland, Seattle, WA (US); Charles Duze, Sammamish, WA (US); Matthew Wood, Sammamish, WA (US); Andrew Michael Himberger, Woodenville, WA (US); Tali Roth, Kirkland, WA (US); Ryan Edward Gregg, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 182 days.

(21) Appl. No.: 14/219,400

(22) Filed: Mar. 19, 2014

(65) Prior Publication Data

US 2015/0269125 A1 Sep. 24, 2015

(51) Int. Cl.
*G06F 40/106* (2020.01)
*G06Q 10/10* (2012.01)
*G06F 40/103* (2020.01)
*H04L 12/58* (2006.01)

(52) U.S. Cl.
CPC .......... *G06F 40/106* (2020.01); *G06F 40/103* (2020.01); *G06Q 10/107* (2013.01); *H04L 51/066* (2013.01)

(58) Field of Classification Search
CPC combination set(s) only.
See application file for complete search history.

(56) References Cited

U.S. PATENT DOCUMENTS

| 6,529,942 B1 | 3/2003 | Gilbert |
| 7,983,701 B2* | 7/2011 | Bell ................. H04M 1/72552 455/403 |
| 8,140,628 B2 | 3/2012 | Gawor et al. |
| 8,166,117 B2 | 4/2012 | Sundstrom |

(Continued)

FOREIGN PATENT DOCUMENTS

| CN | 1612551 A | 5/2005 |
| WO | 2005013035 A2 | 2/2005 |

OTHER PUBLICATIONS

MacWorld OS X Hints, "10.3: Use a local stylsheet to control Mail.app HTML," Feb. 27, 2004<URL=http://hints.macworld.com/article.php?story=20040219094626558>, last accessed Nov. 22, 2016.*

(Continued)

*Primary Examiner* — Sherief Badawi
*Assistant Examiner* — James T Tsai
(74) *Attorney, Agent, or Firm* — Talem IP Law, LLP

(57) ABSTRACT

Techniques are described herein for normalizing the recipient style of electronic messages while preserving the discernible intent of the sender. Given an electronic message or series of messages with varying visual styles applied to message text and other content, the electronic message may be transformed with a normalized and consistent formatting style that is more pleasing to the recipient, while preserving the sender's discernible intent in stylizing the message.

19 Claims, 10 Drawing Sheets

(56) References Cited

U.S. PATENT DOCUMENTS

| | | | | |
|---|---|---|---|---|
| 8,244,814 | B1* | 8/2012 | Brown | H04L 51/08 370/242 |
| 8,543,914 | B2 | 9/2013 | Klassen | |
| 2002/0143871 | A1* | 10/2002 | Meyer | G06Q 10/107 709/204 |
| 2002/0194341 | A1 | 12/2002 | Gupta | |
| 2004/0117736 | A1* | 6/2004 | Newman | G06Q 10/107 715/256 |
| 2005/0027781 | A1 | 2/2005 | Curry et al. | |
| 2005/0097175 | A1 | 5/2005 | Vandeputte | |
| 2005/0114768 | A1* | 5/2005 | Atkin | H04L 51/04 715/205 |
| 2007/0126736 | A1* | 6/2007 | Tolle | G06Q 10/10 345/440 |
| 2008/0016168 | A1 | 1/2008 | Noonan et al. | |
| 2009/0164888 | A1* | 6/2009 | Phan | G06F 17/2785 715/248 |
| 2009/0204624 | A1* | 8/2009 | Basson | G06Q 10/08 |
| 2010/0107087 | A1* | 4/2010 | De Medeiros | G06Q 10/10 715/748 |
| 2010/0114562 | A1* | 5/2010 | Hutchinson | G06F 17/2229 704/9 |
| 2010/0115038 | A1 | 5/2010 | McEachern et al. | |
| 2010/0125807 | A1* | 5/2010 | Easterday | G06F 3/0485 715/785 |
| 2010/0257444 | A1 | 10/2010 | Bever et al. | |
| 2011/0058101 | A1* | 3/2011 | Earley | H04L 12/1822 348/461 |
| 2011/0276872 | A1* | 11/2011 | Kataria | G06F 17/214 715/234 |
| 2012/0117082 | A1* | 5/2012 | Koperda | G06F 16/3331 707/748 |
| 2012/0221936 | A1* | 8/2012 | Patterson | G06Q 20/123 715/230 |
| 2012/0290671 | A1 | 11/2012 | Pak et al. | |
| 2013/0117008 | A1* | 5/2013 | Condie | G06F 17/289 704/2 |
| 2013/0179150 | A1* | 7/2013 | Eriksson | G06Q 10/10 704/9 |
| 2013/0185051 | A1* | 7/2013 | Buryak | G06F 17/248 704/2 |
| 2014/0040730 | A1* | 2/2014 | Prasad | G06F 17/218 715/249 |

OTHER PUBLICATIONS

Scott Loban, "Introduction to CSS," published Nov. 16, 2001. <URL=http://www.quepublishing.com/articles/article.aspx?p=24102&segNum=3>.*

Mac OS X Hints, "Use a local stylesheet to control mail.app HTML," Feb. 27, 2004. <URL=http://hints.macworld.com/article.php?story=20040219094626558>.*

"Customized mail format and attachments based on receiver's email preferences." ip.com Disclosure No. IPCOM000123740D; Authors et. al.: IBM Original Publication Date: Apr. 5, 2005 (Year: 2005).*

"International Search Report & Written Opinion Issued in PCT Patent Application No. PCT/US2015/020846", dated May 13, 2015, 12 Pages.

"Cascading Style Sheets", Published on: Mar. 16, 2014, Available at: http://en.wikipedia.org/w/index.php?title=Cascading_Style_Sheets&oldid=599919675.

"Email", Published on: Mar. 17, 2014, Available at: http://en.wikipedia.org/w/index.php?title=Email&oldid=600054740.

"XSLT", Published on: Mar. 5, 2014, Available at: http://en.wikipedia.org/w/index.php?title=XSLT&oldid=598238570.

"International Preliminary Report on Patentability Issued in PCT Application No. PCT/US2015/020846", dated Jun. 8, 2016, 10 Pages.

Henick, Ben, "HTML & CSS: The Good Parts (Animal Guide)", O'Reilly Media Publishers, Feb. 28, 2010, 352 Pages.

"Oral Hearing Issued in European Patent Application No. 15714090.6", dated Feb. 19, 2019, 14 Pages.

"First Office Action & Search Report Issued in Chinese Patent Application No. 201580014662.7", dated Feb. 19, 2019, 13 Pages.

Holzschlag, Molly E., "Using HTML and XHTML—Special Edition", By Que Publishing, May 14, 2002, 10 Pages.

"Office Action Issued in European Patent Application No. 15714090.6", dated Jul. 30, 2018, 11 Pages.

* cited by examiner

NORMALIZING MESSAGE STYLE WHILE PRESERVING INTENT

BACKGROUND

Email applications have expanded beyond transmitting and rendering text-only messages and now often incorporate many formatting and graphics capabilities through use of hypertext markup language (HTML) and in some cases rich text format (RTF). Users can now prepare messages in a manner reminiscent of word processing applications. However, styles and other formatting applied by the sender (either intentionally or as a default by the sender's email application) may not be appreciated by the recipient. For example, very small font sizes or certain glyph variations may be difficult for the recipient to read. In addition, as electronic messages traverse different clients and services, a single series of messages containing multiple replies and forwards may contain a mix of font faces, sizes and colors resulting from different default—or sender-intentional—formatting choices in the various messaging client applications. The result may be that electronic messages look cluttered and confusing to recipients.

Some existing techniques to address recipient-based preferences have focused on normalizing the content of the electronic messages by enforcing stylistic changes on all the text in the message. However, these existing techniques may alter formatting intentionally introduced by the sender of the electronic message, causing text to lose its intended emphasis.

BRIEF SUMMARY

Techniques are disclosed for normalizing the style of electronic messages for a recipient while preserving the discernible intent of the sender.

As described herein, a messaging application at a client or server can incorporate or access a service that enables normalized styles in rendered messages—while not losing the formatting intention specifically applied by the sender.

A service that enables normalized styles can receive a message containing content having one or more styles and generate a message view that contains a consistent, or normalized, style. However, where there is specific formatting within a sender's message, the intentional adjustments in style to a part of the message are not lost by the normalization. Instead, the service discerns the sender's intent in part by analyzing the message for style(s) in the content that can indicate an intentional emphasis or difference from the default or surrounding style for the content.

In some cases, methods of normalizing message style for a recipient while preserving intent of a sender can include receiving a message having a sender style from a sender; and generating a message view of the message in a recipient style that preserves a discernable intent of the sender. The recipient style can include a normalized recipient style and an intent-preserving recipient style. The intent of the sender can be determined (or discerned) for example by analyzing the message to determine default appearance modifiers for content and sender-customized appearance modifiers for content. Default appearance modifiers can be replaced according to the normalized recipient style and sender-customized appearance modifiers can be replaced according to the intent-preserving recipient style.

In some cases, methods of normalizing message style for a recipient while preserving intent of a sender can include receiving a first message having a sender style comprising formatting elements for content of the first message; analyzing the first message including the formatting elements for sender-customized content; and assigning a marker for at least an instance of the sender-customized content. The sender style for content not assigned with the marker can be replaced with a normalized recipient style in the first message. In some cases, the sender style for the sender-customized content can be replaced with an intent-preserving recipient style in the first message, wherein the intent-preserving recipient style comprises a user-selected formatting element to indicate emphasis.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Techniques are disclosed for normalizing the style of electronic messages for a recipient while preserving the discernible intent of the sender.

Given an electronic message with varying visual styles applied by the sender to message text and other elements, the electronic message may be transformed to a normalized and consistent formatting style that is aesthetically pleasing to the recipient, while preserving the sender's discernible intent in stylizing the message.

In some implementations, the electronic message may be formatted using hypertext markup language (HTML) or rich text format (RTF) language. In some implementations a series of electronic messages with varying visual styles comprising multiple replies on the same topic, also referred to as a thread, may be transformed to create an appealing visual interface across multiple electronic messages.

Figure 1A:
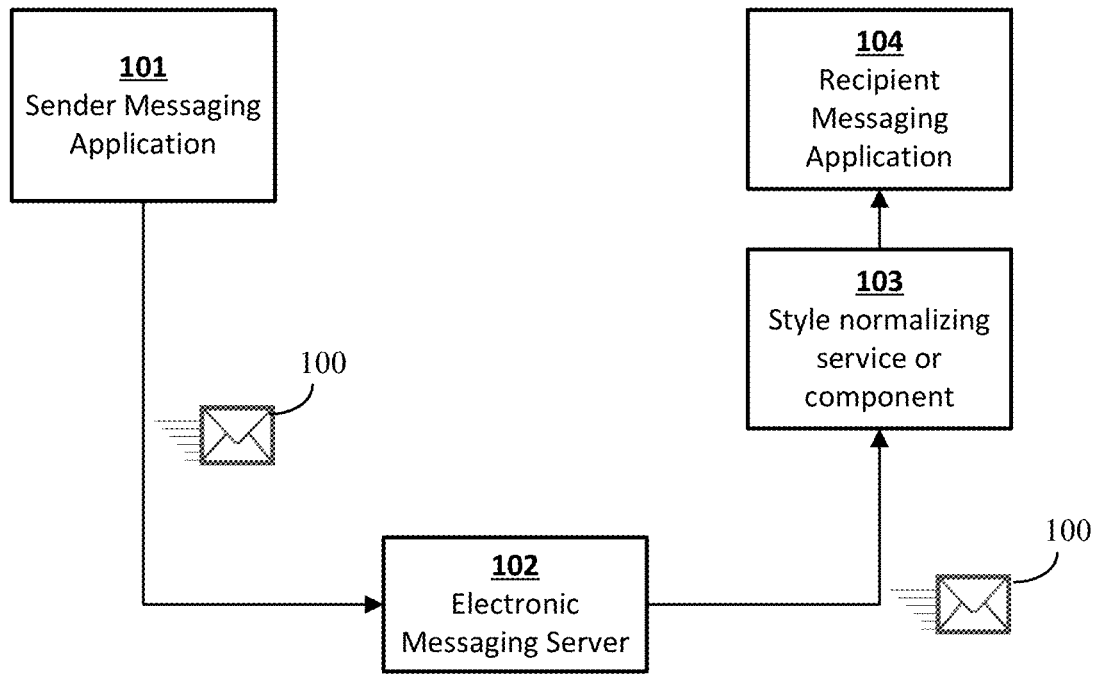
FIG. 1A shows an environment in which certain implementations of the techniques described herein for normalizing electronic message styles may be practiced.

FIG. 1A shows an environment in which certain implementations of the techniques described herein for normalizing electronic message styles may be practiced. In FIG. 1A, electronic message 100 (representing an email, text, or post) is shown being sent from a sender's messaging application 101. After passing through an electronic messaging server 102 to be routed, message 100 may be transformed by style normalizing service or component 103 on its way to being rendered by recipient's messaging application 104.

The style normalizing service or component 103 can generate a message view that contains a consistent, or normalized, style regardless of the style of the content in the received message. However, where there is specific formatting within a sender's message, the intentional-by-the sender adjustments in style to a part of the message are not lost by the normalization. Instead, the service discerns the sender's intent in part by analyzing the message for style(s) in the content that can indicate an intentional emphasis or difference from the default or surrounding style for the content. In some implementations the sender's intent may be preserved in the recipient style using preferred recipient styles having equivalent, but not identical, emphasis.

For example, a first message may be sent by a first sender with a sender style of 12 point Times New Roman font and a second message may be sent by a second sender with a sender style of all capital letters in an Arial font. The service (e.g., style normalizing service or component 103) can receive these messages and enable the messages to be rendered in the recipient preferred style of, for example, 10 point Calibri so that the recipient's mailbox, message wall, dialog box, message history viewer, or other form or format of presenting content contains messages in a consistent style. If the first message includes some terms that are underlined, the service can preserve the sender's intent by marking the terms with an indication of a discernable intent (e.g., that the terms include a sender-customized characteristic or appearance modifier). The indication associated with the terms can allow those terms to be underlined when rendering the message in the recipient style of 10 point Calibri. If the recipient style specifies that no underlining is to be included in messages, the message can be rendered with a replacement style applied to the terms that are marked with the indication.

In various implementations, style normalizing service or component 103 implementing proposed techniques may be a component of the electronic messaging server 102, a component of the recipient's messaging application 104, or part of an intermediate service between the electronic messaging server and the electronic messaging client.

In FIG. 1A, style normalizing service or component 103 is depicted functionally, but may be running within electronic messaging server 102 system components, on components within the recipient messaging application 104, or on its own server or system.

In some implementations, techniques may be implemented in services or components spanning more than one system layer, for example when a sender style is transformed or modified at multiple component layers.

Figure 1B:
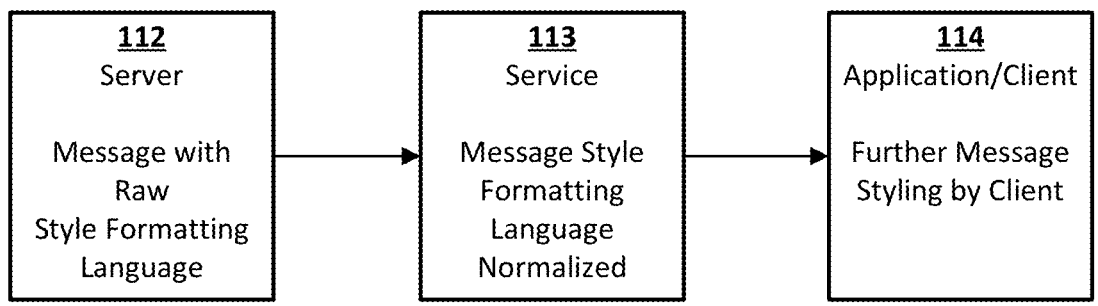
FIG. 1B shows a block diagram in which the processing of style formatting language using the proposed techniques is performed by multiple components.

FIG. 1B shows a block diagram in which the processing of a style formatting language (e.g., HTML) using the proposed techniques is performed by multiple components. In FIG. 1B, server 112 receives an electronic message styled in raw style formatting language. The electronic message is routed to service 113, which performs certain sender style analysis and transformation on the unmodified message. The transformation by the service may include adjustments to metadata or other markup associated with the message. The electronic message is then routed to client 114, where the electronic message may undergo further style alterations finalizing the transformation and rendering according to the client settings of the particular recipient.

It should be noted that embodiments herein may be implemented as part of any software or firmware which provides electronic messaging services to an end-user. An "electronic messaging application" refers to any application or user interface which allows the sending of electronic messages (such as email, texts, or posts) to other recipients over local networks or internetworks. Electronic messages may also be referred to herein as "messages," and electronic messaging applications may be referred to as "messaging applications." These terms may be used interchangeably throughout the disclosure.

Although specific examples directed to email applications are described herein for implementing the techniques for normalizing the formatting of electronic messages while preserving the intent of the sender, other messaging services and modalities, such as instant messaging (SMS, MMS) and social media, may also implement the techniques. Thus, embodiments may be implemented in a variety of electronic messaging applications, services, servers, systems, platforms, and devices. It should be understood that the described features and scenarios can be appropriate for messaging modalities beyond email, which is used simply as an illustrative implementation.

An email application refers to a program that enables a user to access the user's email. The email application may be a local application running on the user's computing device, mobile device, or a web application accessed by the user via a browser running on the user's computing device, smartphone, mobile device, or other form factor.

Example email applications that may include and/or implement the techniques described herein include, but are not limited to, Microsoft Outlook®, IBM Lotus Notes®, Apple® Mail, Google Gmail®, Outlook.com, and Yahoo!® Mail. Email and other electronic messaging services are often incorporated into personal information managers which provide additional services such as calendaring, task management, and contact management. An "electronic messaging server" refers to systems and software running in corporate or cloud-service data centers for providing electronic messaging services to groups of users. Examples of electronic messaging services and or servers that may implement the techniques described herein include, but are not limited to, Microsoft Exchange Server®, Google Gmail®, Apple iCloud® Mail, Microsoft Outlook.com, and Yahoo!® Mail.

In some electronic messaging applications, it is possible to modify the appearance of text in an email or other electronic message through the use of "appearance modifiers." These appearance modifiers describe the visual appearance of text, rather than its semantic content. Appearance modifiers may apply specifically to text ranges, modifying text with varying font faces and sizes, bolding, underlining, italicizing, changing the color of text, all caps text, small caps text, strikethrough text and the like. Paragraph-level appearance modifiers are also possible, for example, centering, line-spacing, kerning, spacing between paragraphs, block text and the like. Of course, the above appearance modifiers are only examples and many other kinds of appearance modifiers may be applied to text, paragraphs, or other message elements.

The appearance modifiers or other metadata or markup used to indicate the visual appearance of text and other content may be used to implement a particular "style". Thus, a sender style refers to the visual appearance of text and other content used by a sender and/or the sender's messaging application. The sender style may be embodied in the message by the appearance modifiers or other metadata or markup. Similarly, a recipient style refers to the visual appearance of text and other content used by the recipient's messaging application—whether as a default style or customized by the recipient user.

Some electronic messaging applications allow the detailed manipulation of message appearance, while some apply more general formatting to the electronic message as a whole. Sometimes, the appearance modifiers are described using standardized style formatting languages such as HTML or RTF. Messages that contain stylized text with appearance modifiers may be known as "rich text messages" or "HTML messages," while those containing only text may be called "plain text messages." Electronic messaging services that are capable of processing only plain text messages send only the text of the electronic message.

Whether a message may be sent with rich text (rich text format or HTML) or plain text depends on the capabilities of the messaging application, the messaging service used by the various senders and recipients, and, often, on the capabilities of the intermediate mail services through which the messages are routed. Electronic messaging services that are capable of handling rich text messages send the text of the message interspersed with descriptive tags and elements instructing a capable electronic messaging application how to stylize the text when it is displayed. The processing of both HTML-formatted electronic messages and RTF-formatted electronic messages is well-understood by practitioners in the art; thus, a detailed explanation is omitted.

Senders and recipients of electronic messages frequently exchange numerous messages on the same topic, replying several times to one another in the course of a discussion. This sequence of electronic messages is sometimes referred to as a "conversation" or "message thread." Different electronic messaging applications depict the messages in a message thread differently—some depict them as a hierarchical "tree" of messages, while others depict them as interspersed, indented text demarcated by their "message header." A message header is the textual representation of the electronic message sender's name and email address, sent time, recipients, and message subject.

The different electronic messages in a message thread may take on a hodgepodge, visually unattractive look and be difficult for readers to understand. For example, when the electronic messages traverse more than one electronic messaging service like from a Gmail® account to an Outlook® account and back again during a conversation thread, one or both of the applications may apply certain settings to the prior conversation thread and/or a current message.

Figure 2:
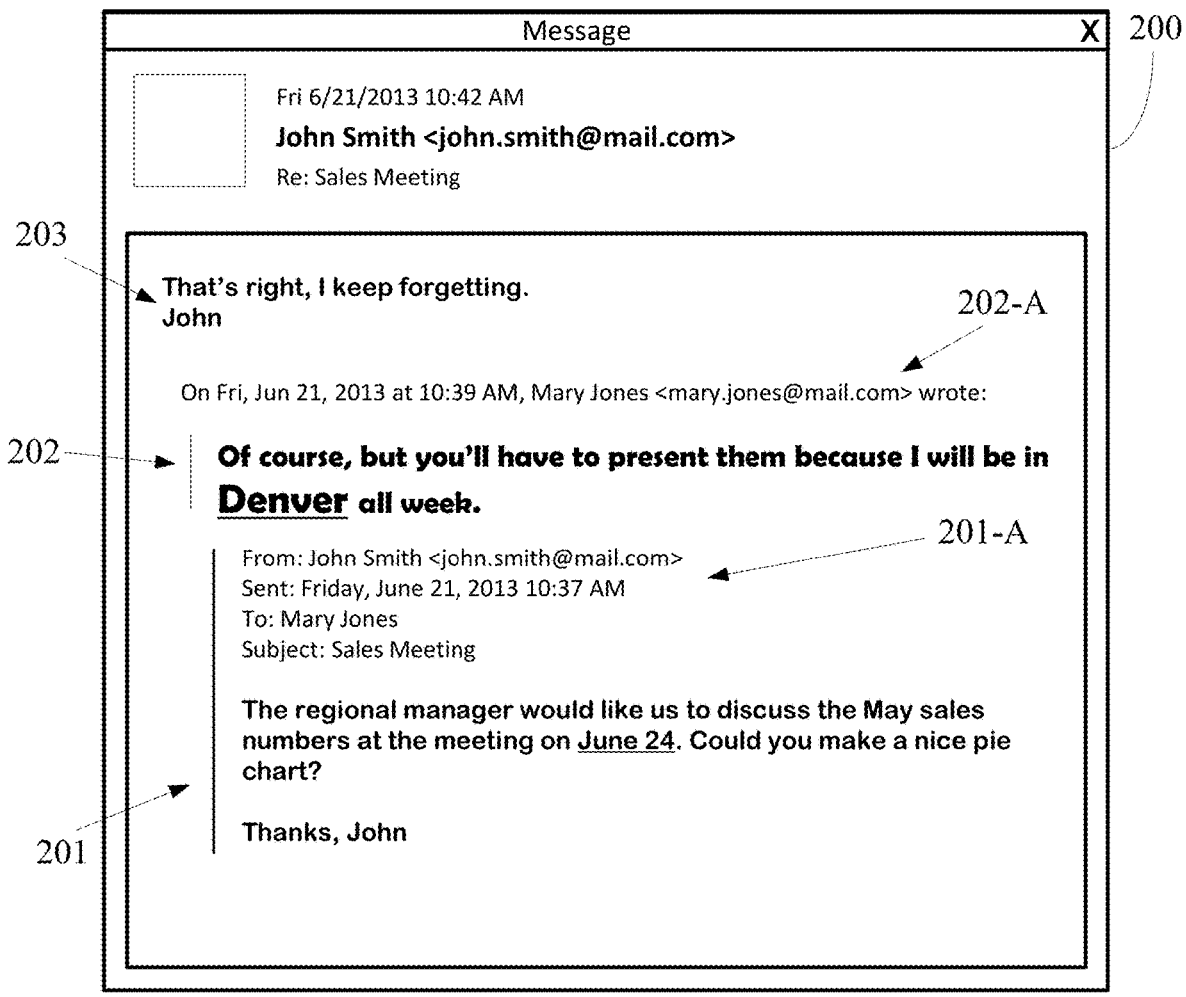
FIG. 2 shows an example email application user interface depicting a message thread having several interspersed messages with different sender styles.

FIG. 2 shows an example email application user interface depicting a message thread having several interspersed messages with different sender styles. An example of the effect of multiple styles in a message can be visualized by briefly looking at FIG. 2. In many cases, the message headers may also have different styles placed by the sender's or the recipient's messaging application, adding further visual clutter.

In the message thread shown in FIG. 2, user interface window 200 shows a three-part interchange of messages between a sender (John) and a recipient (Mary). Original message 201 requests recipient Mary to bring a pie chart to a June 24 meeting. In the original message, the meeting date has been underlined for emphasis. The rest of the message is in John's (the sender's) preferred font and text style. The message header 201-A for the original message 201 is also shown, in a different style.

Mary's reply message 202 is then shown in Mary's preferred style, which is different from John's both in font size, font face, and font style. To emphasize her being out of town that day, Mary reminds John of "Denver" in larger, bolder, and underlined font. Mary's reply 202 is demarcated by a message header 202-A in yet another style. John replies again with message 203. John's final message 203 does not include any sender-customized formatting and is shown in a default message style. Overall, message thread 200 depicts a cluttered appearance in which some formatting has been applied from which a discernable intent may be determined.

Techniques disclosed herein can normalize electronic message content when the content has a mixture of text and formatting styles (such as that shown in FIG. 2 and the accompanying description) while preserving the sender's intent or emphasis.

Figure 3:
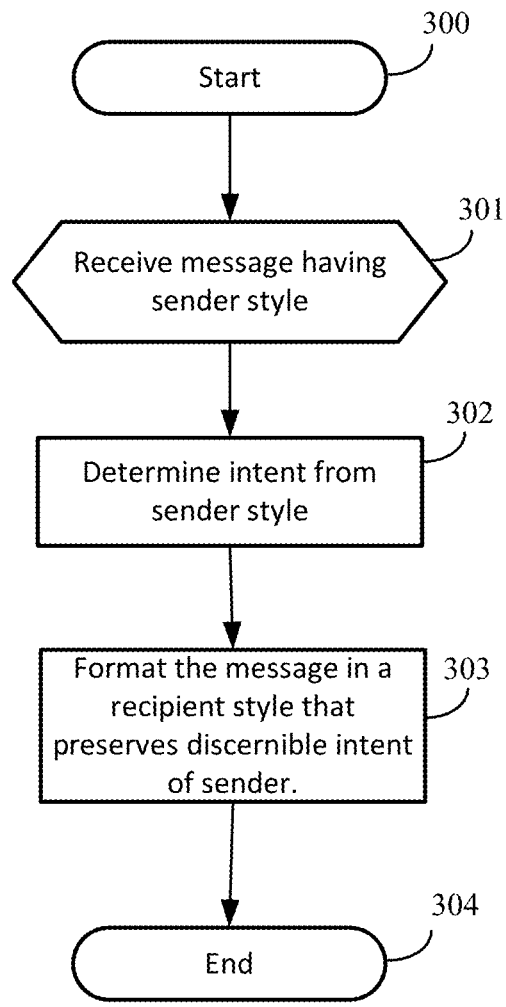
FIG. 3 shows an example process flow diagram for normalizing electronic message content while preserving sender intent.

FIG. 3 shows an example process flow diagram for normalizing electronic message content while preserving sender intent. In the process flow shown in FIG. 3, processing begins with a messaging application/client, messaging server, or intermediate service, any or all of which may have style normalizing capabilities for transforming the sender's message style into a recipient style. Here, the start of processing by these system components is shown in element 300. The component first receives an electronic message having a sender style 301. Sometimes, such an electronic message is formatted using HTML or RTF.

Instead of completely normalizing a message style, the sender's original intent in stylizing the electronic message content can be determined and preserved when there is a discernible intent. The determination of intent stage in processing is reflected in step 302 of FIG. 3. The analysis and determination can be used to distinguish between a sender style that expresses a desire or intent by the sender to emphasize (or deemphasize) some aspect of the message to the recipient, rather than just being a default style for reading or composing the message.

In some cases, electronic messages are stylized—in that they contain basic formatting such as font face and size—but the sender style does not express a discernible intent to emphasize some aspect of the message. An example of sender style that has no discernible intent would be when the sender's messaging application applies a uniform font face and font size to a message because the sender's messaging application has set these characteristics as the default for composing messages. Another example of a sender style that has no discernible intent would be when the sender changes all of the text to a particular font face or font size for his or her own reading convenience, but does not intend to emphasize any particular aspect of the text to the recipient.

On the other hand, some sender styles reveal a discernible intent to emphasize aspects of the message to the recipient. Several examples illustrate the range and manner of emphasis that is possible:

A sender may bold or underline words to emphasize an important due date.

A sender may "shout" to express an emotion using ALL CAPS.

A sender may express enthusiasm for an event by using a cheerful font face to describe its location.

A sender may "sign" her own signature using a cursive-style font face.

A sender may italicize, bold, or block-indent a paragraph that is quoted from another source.

A sender may change a message's background color or pattern to draw attention to it.

Of course, such examples are for illustrative purposes only and are not intended to be limiting in any way. It should also be noted that, in a threaded conversation, the descriptors "sender" and "recipient" are relative to who is replying at what time. For example, when first recipient replies to original sender, the first recipient becomes the sender and the original sender or another person involved in the conversation thread may become the second recipient for the purposes of discerning intent.

In some implementations, determining the sender's discernible intent may be accomplished by analyzing the proportion of message elements having particular appearance modifiers. This may be accomplished by parsing the message's style formatting language commands and content and determining how much content is modified by specifically placed appearance modifiers and how much is modified by default appearance modifiers. A threshold may be established as criteria for determining the sender's discernable intent.

In HTML, for example, an appearance modifier may be applied to text using a tag or tag attribute, for example when a date like "June 24" is underlined. In some encodings of HTML, this would be denoted as "<u>June 24</u>", where "<u>" is the HTML appearance modifier for underlining. Messaging applications capable of reading HTML formatting language may then display the text surrounded by the modifier with an underlined text style.

Another example of a mechanism for applying formatting styles to an electronic message using appearance modifiers is by using a style element. Style elements, defined using in-line HTML encoding or in cascading style sheets (CSS), may define styles for entire classes of HTML elements. For example, a paragraph tag (denoted by the HTML tag "<p>Paragraph Text</p>") may have a default set of text attributes applied to it using these style element definitions, including "font-family: Calibri" and "font-size: 11.0pt". Under the standard rules of HTML processing, when the messaging application reads the "<p>" tag, the messaging application would understand to apply the default font defined in the style definition for the HTML "paragraph" element class.

Style definitions are possible for other HTML formatting tags, as well. For example, the "<span></span>" tag applies the defined formatting to the range of HTML tags and text enclosed in the span tag. Thus, appearance modifiers like "<span style='text-decoration: underline'>June 24</span>" would apply the underline formatting in an equivalent manner to the "<u>" appearance modifier above.

Processing the HTML and understanding sender intent may then proceed by analyzing which appearance modifiers are likely to be intentional for emphasis, and which are likely to be default. For example, after appearance modifier and content analysis, if 80% of the text is styled with the same font face and size, then it may be determined that the sender expressed no discernible intent with respect to that text. The other 20% of the text, however, may include another font face, size, color, weight, style, spacing, or other combination of appearance modifiers. These modifiers may indicate a discernible intent on the part of the sender.

Naturally, the percentage of text with discernible intent may vary widely between senders: some senders seldom style the content of messages, while some senders style message content frequently.

In some implementations, appearance modifiers may be determined to be default style appearance modifiers when an analysis of the message indicates that a particular appearance modifier (or modifiers) satisfies a criteria such whether there is an occurrence of more than a specified number of instances of a particular appearance modifier or style. Then if this threshold is met or exceeded it can be determined that the content associated with the particular modifier(s) is a default style. In addition, or as an alternative, the criteria can include whether the particular appearance modifier or style that is assigned to an amount of content that meets or exceeds a specified percentage of total content, such as described in the above example.

In some implementations, sender-customized appearance modifiers can be determined from analyzing a message for the remaining content after determining the default appearance modifiers. This determination can provide the discernible intent of the sender.

Having identified the intent of the sender style, processing proceeds to step 303 of the process flow in FIG. 3. In step 303, the electronic message is formatted in a recipient style that still emphasizes the appropriate message content by reflecting the intent underlying sender's style choices.

A lookup table or database can be included on the server(s) or accessible by the service (e.g., service 103) and/or the recipient's messaging application (e.g., messaging application 104) to facilitate the mapping of the appearance modifiers. The lookup table or database can provide a correspondence, or mapping, between an appearance modifier associated with the sender style and a normalized appearance modifier of the recipient style. In some cases, additional recipient setting preferences can be included so that sender-customized appearances can be translated into recipient preferred appearances. In some cases, the lookup table or database provides a mapping for markers that may have been applied to the message by the service to indicate default styles and/or sender-customized styles. The mapping of the markers may be included instead of or in addition to the mapping of the specific appearance modifiers.

To continue the example, formatting the message in a recipient style that preserves the original intent of the sender then consists of applying a new recipient style to the 80% with no discernible intent. In many cases, the new recipient style will be a default style set by the recipient (directly or as the default style for the client email application) as a default reading style.

The default style set by the recipient ("default recipient style") may include, for instance, the recipient's preferred font face, size, font color, and message background color. In some cases, the default recipient style will be choices made by default settings within the application, service, or device.

Once the default recipient style has been applied to the 80% of text having no discernible sender intent, the 20% of text having a sender style with a discernible intent may be processed. Depending on the implementation, the other 20% may remain in the sender style, may have at least one formatting element of the sender style applied, or the sender style may be modified according to style equivalents defined by the recipient style but which preserve the sender's intent. It should be noted that the proportion of text with discernible intent may vary greatly from the example of 20%. The proportion is for illustrative purposes only and in any given scenario or case, far less or more text may have discernible intent.

Leaving the sender style (or at least one formatting element of the sender style) unmodified in the text having a discernible intent is relatively straightforward. Often this amounts to no more than leaving intact existing appearance modifiers, like "<b></b>" (for bolding), "<ul></ul>" (for underlining), and "<span></span>" (for detailed style modifications on a block of elements). Moreover, as will be discussed later, some implementations may facilitate the transformation of the intent of sender style to a recipient style that is not identical but still preserves the discernible sender intent.

In some cases, the style normalizing service, component, or client implementing techniques herein may save the message modified by the recipient style by sending the modified formatting language or HTML to the next recipient, or by storing it permanently on an electronic messaging server.

Step 304 depicts the end of processing, in which the formatted message proceeds to its next processing phase which, depending on implementation, may be forwarding to an electronic messaging client for further processing or rendering.

Figure 4A:
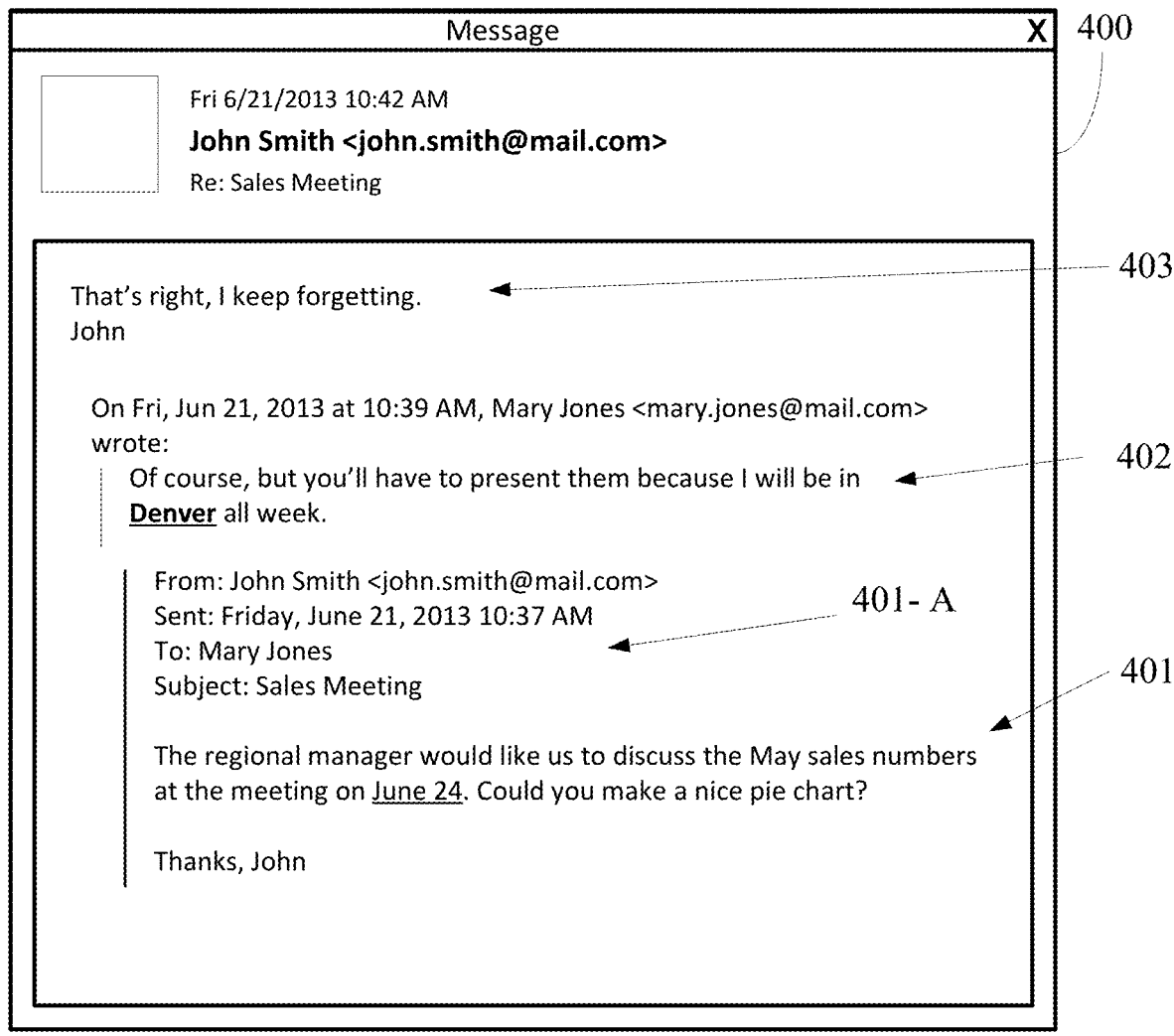
FIG. 4A shows an example representation of an email message viewing interface where a message thread has been transformed by an implementation of the described techniques.

FIG. 4A shows an example representation of an email message viewing interface where the message thread from FIG. 2 with mixed formatting has been transformed by an implementation of the described techniques. In FIG. 4A, window 400 shows the threaded exchange of discussion conducted about sales information to be presented at a meeting between two coworkers.

Applying an implementation of the described techniques, the style of individual messages 401, 402, and 403 have been transformed to a normalized reading experience. By applying an implementation of the described techniques, discernable sender intent is still maintained. For example, in message 401, "June 24" is still underlined even though the remaining text has been normalized (e.g, had the default recipient style applied based on the client application and user viewing the message). The message header 401-A, is also shown as being normalized, but the header does not necessarily have the same style applied as the body text.

In addition, in message 402, Mary's style choice of a larger and different font have been removed, leaving emphatically depicted only the discerned intent of the information she wanted to highlight, the word "Denver," to remind John that she would be out of town for the meeting. In this example, the bold and underline formatting elements are permitted to remain, while the font size and font face (glyph, etc.) are normalized. In some cases, the font size may also be permitted to remain and even the entire style for the sender-customized text could remain.

It should be noted that it is possible that the same person using different client applications (either because of using multiple devices or because of using different email applications) may have their messages normalized for their own message view.

Lastly, in message 403, no discernable intent was determined so John's style has been again removed and normalized to a standard, readable font chosen automatically by the viewing email application or based on default settings selected by Mary (or other recipient).

Figure 4B:
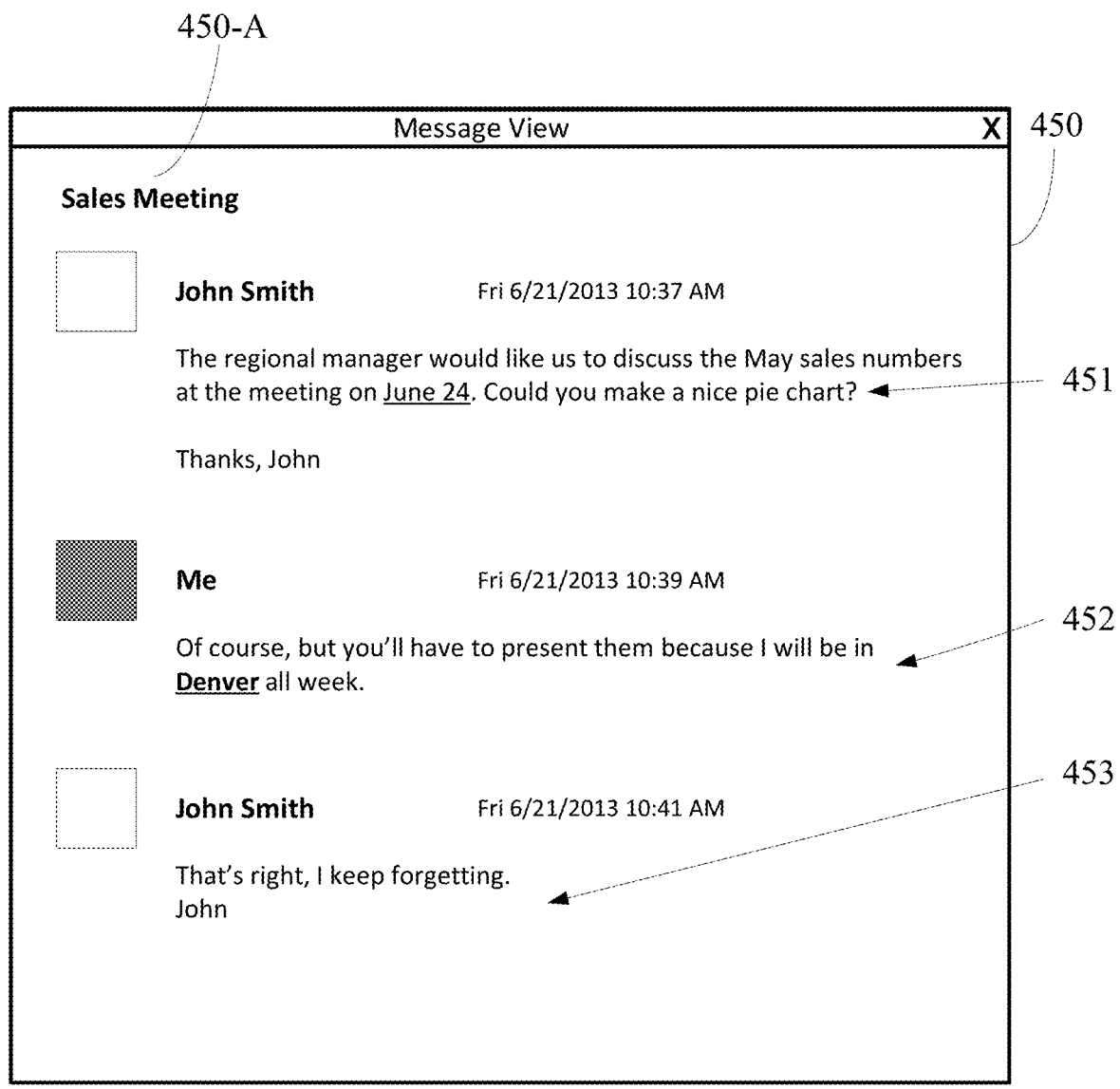
FIG. 4B shows another example representation of an email message viewing interface where a message thread has been transformed by an implementation of the described techniques.

Richer message style transformations may also be available in certain implementations. FIG. 4B shows another example representation of an email message viewing interface where a message thread has been transformed by an implementation of the described techniques. The interface in FIG. 4B shows another transformation of the message thread contained in FIGS. 2 and 4A.

In FIG. 4B, the same message thread from FIGS. 2 and 4A is displayed in message viewing window 450. Message view 450 shows a layout of messages in the message thread transformed by moving the message subject 450-A to the top and presenting messages 451, 452, and 453 in a streamlined layout. Message view 450 also removes thread indenting and clarifies the name of the sender and sent time and removes extraneous header information. In addition, the conversation thread is displayed from oldest to newest.

Also, font style has been normalized to a standard, readable font across all messages 451, 452, and 453, chosen automatically by the viewing email application or based on default settings selected by Mary (or another recipient viewing the messages). Sender intent is also preserved in the recipient style of message 451, which retains John's original underlining of the date of the meeting, "June 24". Likewise, Mary's intent of emphasizing "Denver" in message 452 is retained by retaining bolding and underlining of the word. In some cases, only underlining would be maintained or the formatting can be set to a default emphasis determined by a mapping setting, for example, found in a lookup table associated with the service, component or application.

Some implementations may facilitate the transformation of the sender style to a recipient style that is not equivalent but still preserves the discernible sender intent. For example, a recipient may strongly dislike "ALL CAPS" text style within electronic messages. Therefore, some implementations may enable a recipient user to customize a recipient style that transforms "ALL CAPS" text into bolded or underlined words. As a further example, some recipients may prefer to normalize the way that important dates are emphasized; instead of having a hodgepodge of styles from different senders depicting important dates (bolding, underlining, garish colors, etc.), the recipient may prefer to see all emphasized dates in the same style, for example by underlining them. Both of these customized recipient styles maintain the original intent of the sender—emphasis of a demand/action item or important date—while normalizing and beautifying the formatting to suit the recipient's aesthetic. Thus, content as well as the appearance modifiers may be analyzed when discerning intent.

Figure 5A:
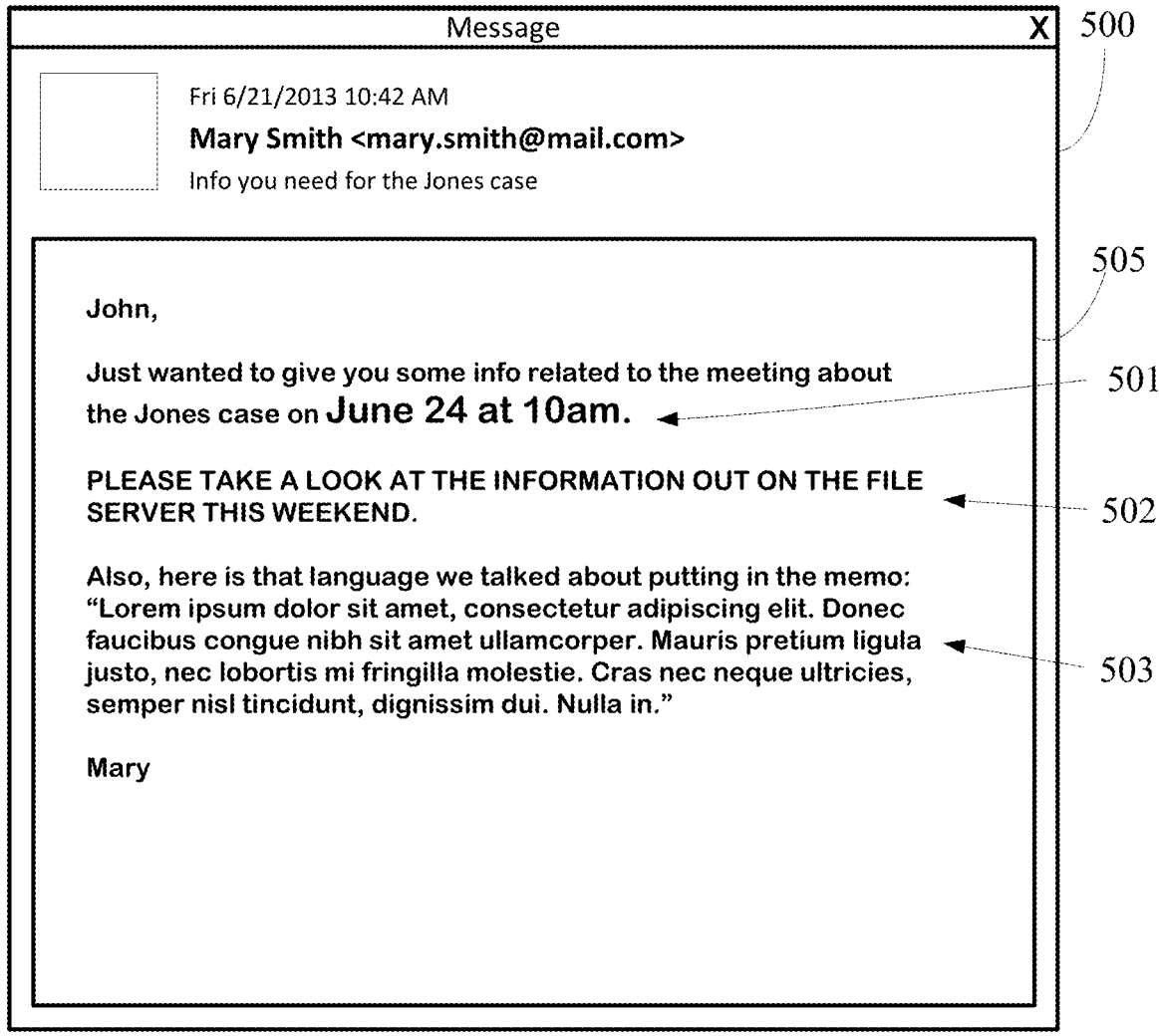
FIGS. 5A-5C show example representations of email message viewing interfaces where a message formatted in a sender style may be transformed into a preferred recipient style that maintains the original intent of the sender using an implementation of the described techniques.
Figure 5B:
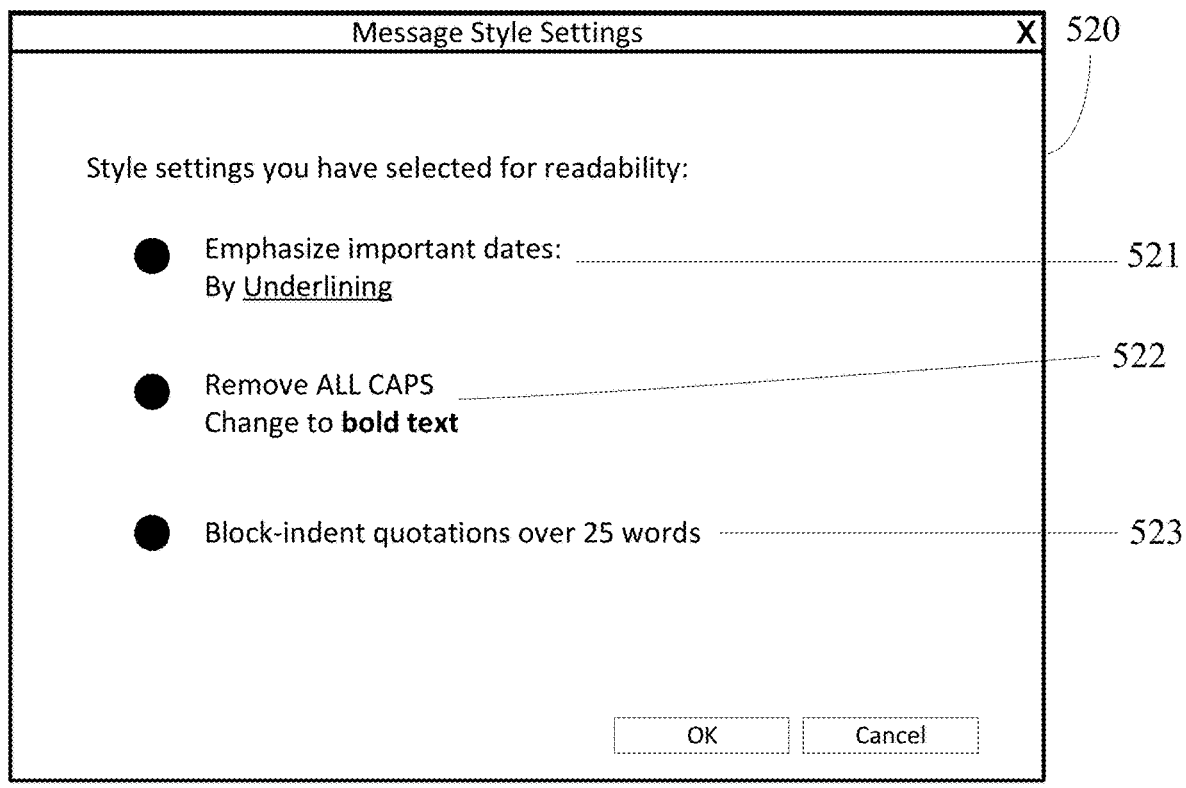
Figure 5C:
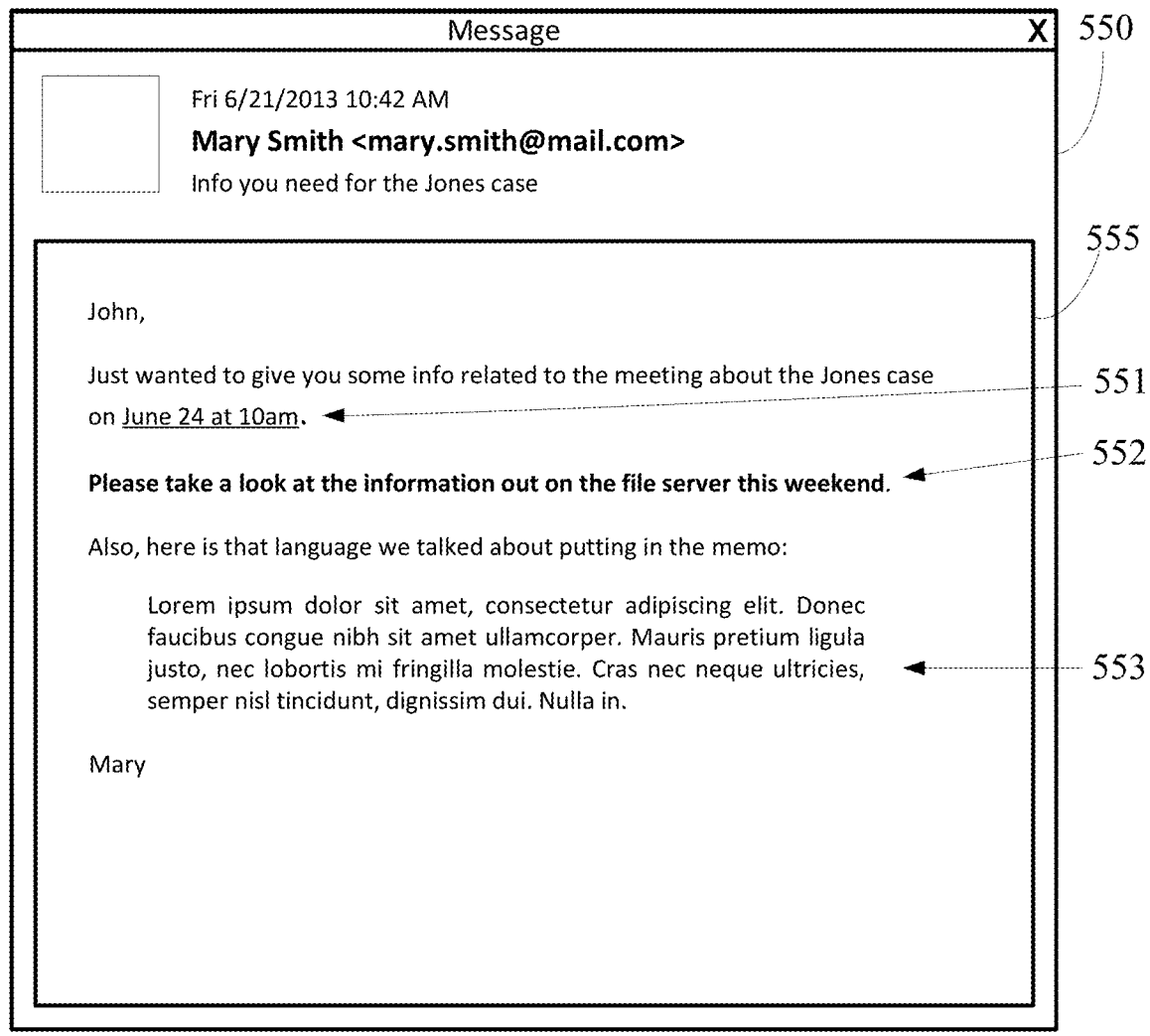

FIGS. 5A-5C show example representations of email message viewing interfaces where a message formatted in a sender style may be transformed into a preferred recipient style that maintains the original intent of the sender using an implementation of the described techniques.

FIG. 5A shows an example email from Mary to John 500. In the message, Mary gives John the date and time 501 of an important meeting, which she has emphasized in larger, bolded font. Next, Mary emphasizes to John the importance of reading certain materials before coming to the meeting in section 502 by displaying the text in all-capitalization. Finally, Mary puts an extensive quotation 503 of language they had discussed putting in a memo for the meeting. Mary places the quotation 503 in quote marks. Finally, it should be noted that Mary's entire message body 505 is in a strong, bolded font.

FIG. 5B shows an example user interface screen indicating a preferred recipient style for reading messages for the illustrative example. An example user interface 520 such as that in FIG. 5B may be present in a messaging application implementing proposed techniques. Naturally, many possible configurations of a recipient style configuration screen are possible, so the example is non-limiting.

In FIG. 5B, recipient (John) has selected several preferences for transforming a sender style to a recipient style and these preferences are shown in the interface screen for the illustrative example. Here, the recipient settings indicate that dates are to be emphasized by underlining (521). The recipient settings also indicate that text in all-caps (from which acronyms may be filtered out) is to be replaced with bolded text (522). In some cases where all-capitalized text is considered a default text style (and not a discernable sender intent), the setting regarding the all-capitalization replacement would not be applied since the section would not be marked as being an area with a discernable sender intent. Finally, the recipient settings also indicate that quotations exceeding twenty-five words are to be block-indented (523).

FIG. 5C shows a message view for the message in the sender style shown in FIG. 5A after having been transformed according to preferences selected via FIG. 5B. Here, the message body 555 has been normalized. The discernable intent related to sections 501, 502, and 503 of FIG. 5A are preserved. For example, the style of emphasis on the date of the meeting has been transformed into a new style as selected in FIG. 5B, by underlining the date and time 551. The all-capitalized text of the sender style has been transformed into recipient's preferred style of bolded text 552. In addition, the lengthy quotation has been block-indented 553 to suit the recipient John's preferred style for quotations.

It should be understood that the example messages and user interfaces in FIGS. 4A-4B and 5A-5C are merely illustrative of certain implementations of the techniques described herein, and should not be construed as limiting.

Figure 6A:
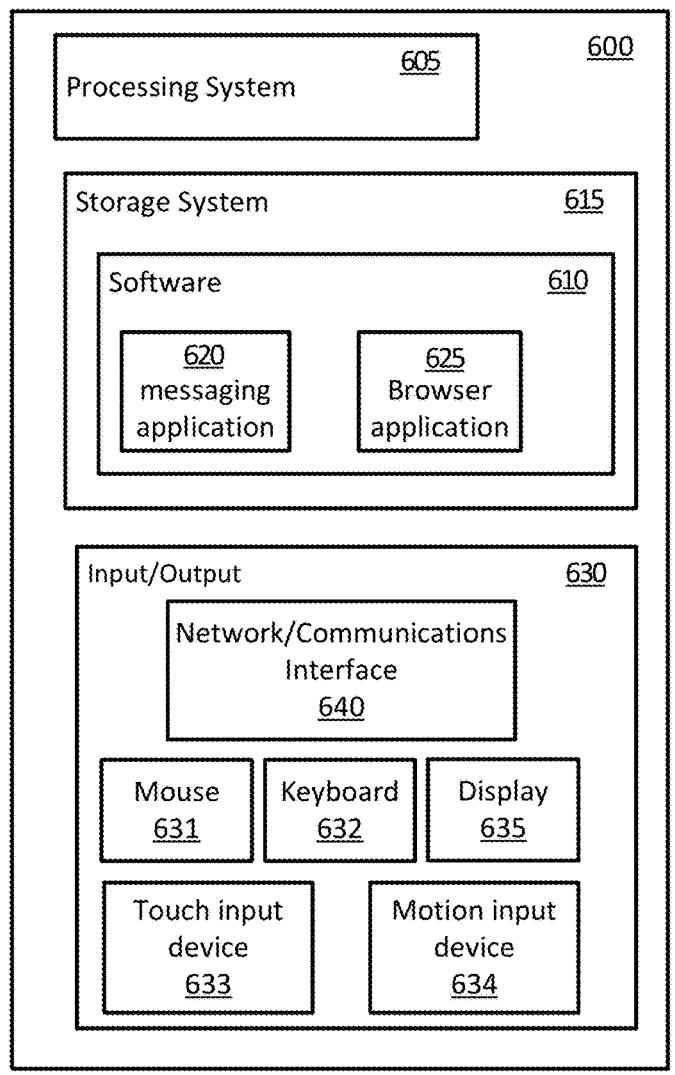
FIG. 6A shows a block diagram illustrating components of a system used in some embodiments.

FIG. 6A shows a block diagram illustrating components of a system used in some embodiments. System 600 may be implemented within a single computing device or distributed across multiple computing devices or sub-systems that cooperate in executing program instructions. System 600 can be used to implement myriad computing devices, including but not limited to a personal computer, a tablet computer, a reader, a mobile device, a personal digital assistant, a wearable computer, a smartphone, a laptop computer (notebook or netbook), a gaming device or console, a desktop computer, or a smart television. Accordingly, more or fewer elements described with respect to system 600 may be incorporated to implement a particular computing device.

System 600, for example, includes a processing system 605 of one or more processors which processes data according to the instructions of software 610 stored on a storage system 615. Examples of processors of the processing system 605 include general purpose central processing units, application specific processors, and logic devices, as well as any other type of processing device, combinations, or variations thereof.

The software 610 can include an operating system and application programs such as a messaging application 620 and/or web browsing application 625. In some cases, the software 610 can include a style normalizing service or component 103. Device operating systems generally control and coordinate the functions of the various components in the computing device, providing an easier way for applications to connect with lower level interfaces like the networking interface. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system may be implemented both natively on the computing device and on software virtualization layers running atop the native Device operating system (OS). Virtualized OS layers, while not depicted in FIG. 6A, can be thought of as additional, nested groupings within the operating system space, each containing an OS, application programs, and APIs.

Storage system 615 may comprise any computer readable storage media readable by the processing system 605 and capable of storing software 610 including the messaging application 620 and/or browsing application 625.

Storage system 615 may include volatile and nonvolatile, removable and non-removable media implemented in any method or technology for storage of information, such as computer readable instructions, data structures, program modules, or other data. Examples of storage media include random access memory, read only memory, magnetic disks, optical disks, CDs, DVDs, flash memory, virtual memory and non-virtual memory, magnetic cassettes, magnetic tape, magnetic disk storage or other magnetic storage devices, or any other suitable storage media. In no case is the storage medium a propagated signal or carrier wave.

In addition to storage media, in some implementations storage system 615 may also include communication media over which software may be communicated internally or externally. Storage system 615 may be implemented as a single storage device but may also be implemented across multiple storage devices or sub-systems co-located or distributed relative to each other. Storage system 620 may comprise additional elements, such as a controller, capable of communicating with processor 605.

Software 610 may be implemented in program instructions and among other functions may, when executed by system 600 in general or processing system 605 in particular, direct system 600 or the one or more processors of processing system 605 to operate as described herein.

In general, software may, when loaded into processing system 605 and executed, transform computing system 600 overall from a general-purpose computing system into a special-purpose computing system customized to normalize the style of electronic messages as described herein for each implementation. Indeed, encoding software on storage system 615 may transform the physical structure of storage system 615. The specific transformation of the physical structure may depend on various factors in different implementations of this description. Examples of such factors may include, but are not limited to the technology used to implement the storage media of storage system 615 and whether the computer-storage media are characterized as primary or secondary storage.

The system can further include input/output (I/O) devices 630. I/O devices can include devices and components that enable communication to and from the system 600. User input and output devices can include input devices such as a mouse 631, track pad (not shown), keyboard 632, microphone (not shown), a touch device 633 for receiving a touch gesture from a user, a motion input device 634 for detecting non-touch gestures and other motions by a user, and other types of input devices and their associated processing elements capable of receiving user input.

The I/O devices 630 may also include output devices such as display screens 635, speakers (not shown), haptic devices for tactile feedback, and other types of output devices. In certain cases, the input and output devices may be combined in a single device, such as a touchscreen display which both depicts images and receives touch gesture input from the user. Visual output may be depicted on the display 635 in myriad ways, presenting graphical user interface elements, text, images, video, notifications, virtual buttons, virtual keyboards, or any other type of information capable of being depicted in visual form. The I/O devices 630 may also include associated software executed by the OS in support of the various user input and output devices. Such software assists the OS in communicating user interface hardware events to application programs using defined mechanisms.

Communications interface 640 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

It should be noted that many elements of system 600 may be included in a system-on-a-chip (SoC) device. These elements may include, but are not limited to, the processing system 605, a communications interface 640, and even elements of the storage system 615.

It should be understood that computing system 600 is generally intended to represent a computing system with which software is deployed and executed in order to implement an application with the methods for normalizing the style of electronic messages while preserving sender intent, as described herein. However, computing system 600 may also represent any computing system on which software may be staged and from where software may be distributed, transported, downloaded, or otherwise provided to yet another computing system for deployment and execution, or yet additional distribution.

Figure 6B:
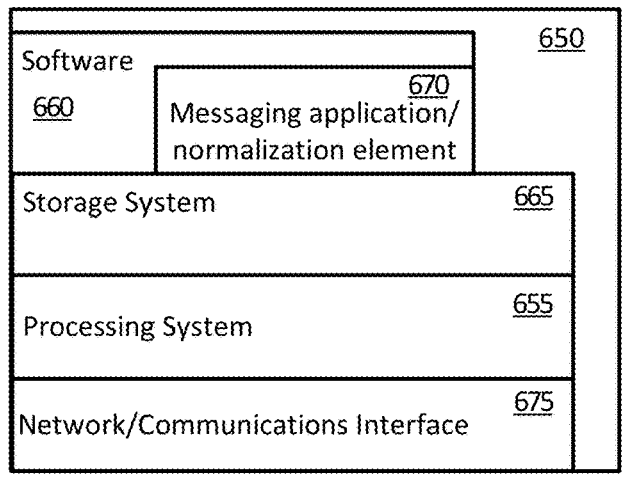
FIG. 6B shows a block diagram illustrating components of a system used in some embodiments.

FIG. 6B shows a block diagram illustrating components of a system used in some embodiments. System 650 may be implemented within a single computing device or distributed across multiple computing devices or sub-systems that cooperate in executing program instructions. The system 650 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 650 can include a processing system 655, which may include one or more processors and/or other circuitry that retrieves and executes software 660 from storage system 665. Processing system 655 may be implemented within a single processing device but may also be distributed across multiple processing devices or sub-systems that cooperate in executing program instructions.

Examples of processing system 655 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

As with storage system 615, storage system 665 may comprise any computer readable storage media readable by processing system 655 and capable of storing software 660. Storage system 665 may be implemented as a single storage device but may also be implemented across multiple storage devices or sub-systems co-located or distributed relative to each other. Storage system 665 may include additional elements, such as a controller, capable of communicating with processing system 655.

Software 660 may be implemented in program instructions and among other functions may, when executed by system 650 in general or processing system 655 in particular, direct the system 650 or processing system 655 to operate as described herein for enabling normalized message styles. Software 660 may provide program instructions that implement a messaging application as well as (or alternatively) provide program instructions for normalizing message styles 670. Software 660 may implement on system 650 components, programs, agents, or layers that implement in machine-readable processing instructions the methods described herein as performed by the server 112, service 113, and even the client 114.

Software 660 may also include additional processes, programs, or components, such as operating system software or other application software. Software 702 may also include firmware or some other form of machine-readable processing instructions executable by processing system 655.

System 650 may represent any computing system on which software 660 may be staged and from where software 660 may be distributed, transported, downloaded, or otherwise provided to yet another computing system for deployment and execution, or yet additional distribution.

In embodiments where the system 650 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 675 may be included, providing communication connections and devices that allow for communication between system 650 and other computing systems (not shown) over a communication network or collection of networks (not shown) or the air.

It should be noted that many elements of system 650 may be included in a system-on-a-chip (SoC) device. These elements may include, but are not limited to, the processing system 655, the communications interface 675, and even elements of the storage system 665 and software 660.

Figure 7:
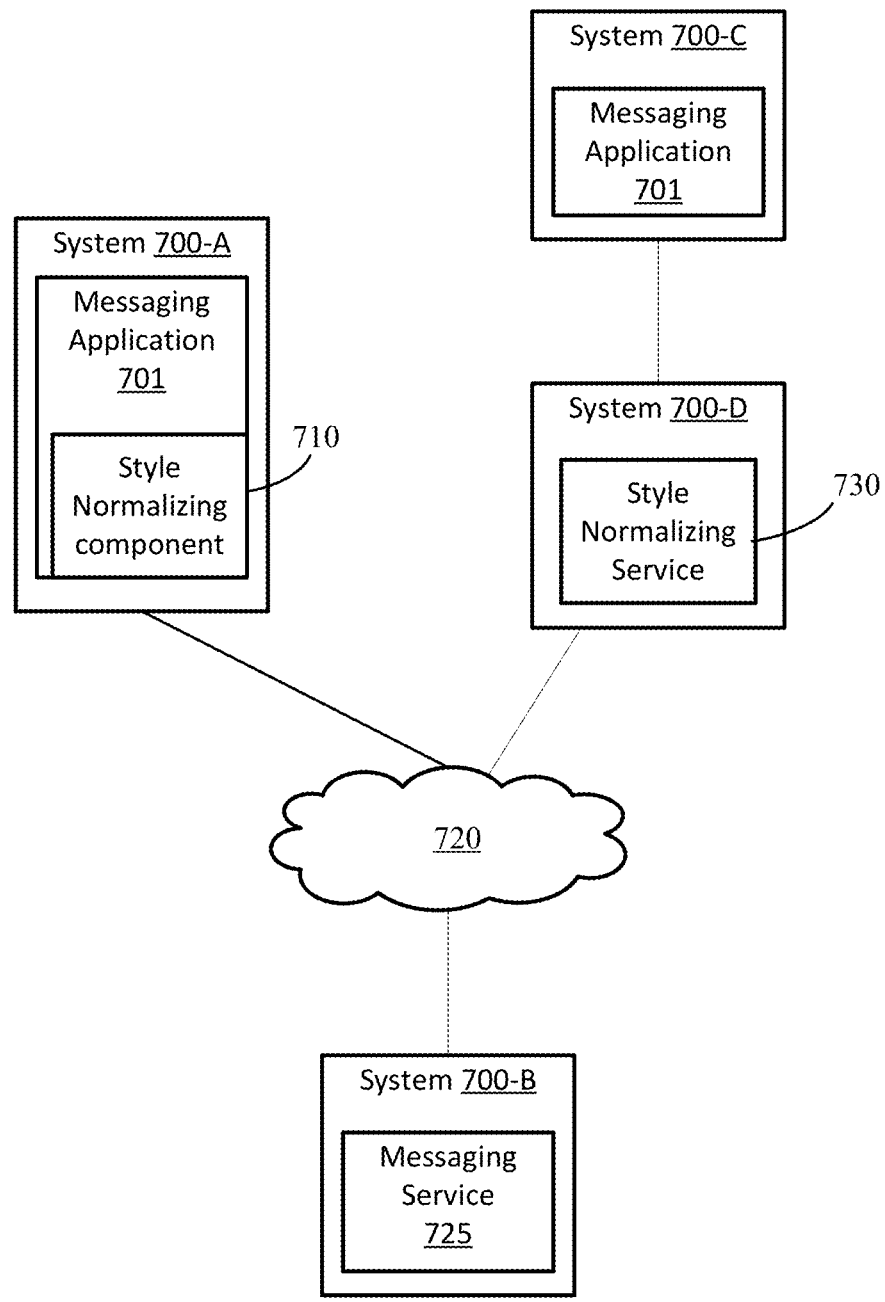
FIG. 7 shows an example system architecture in which implementations of techniques for normalizing the style of electronic messages while preserving the intent of the sender may be carried out.

FIG. 7 shows an example system architecture in which implementations of techniques for normalizing the style of electronic messages while preserving the intent of the sender may be carried out. A messaging application 701 may be implemented on a computing system 700-A such as described with respect to system 600 of FIG. 6A. The user of the messaging application 701 may a recipient and sender of messages.

Messaging application 701 may communicate over network 720 with messaging service 725 embodied on system 700-B such as described with respect to system 650 of FIG. 6B. Messaging service 725 may perform the electronic message routing, message storage, and even application-level functions in cases where messaging application is web-hosted.

The network 720 can include, but is not limited to, a cellular network (e.g., wireless phone), a point-to-point dial up connection, a satellite network, the Internet, a local area network (LAN), a wide area network (WAN), a WiFi network, an ad hoc network, an intranet, an extranet, or a combination thereof. The network may include one or more connected networks (e.g., a multi-network environment) including public networks, such as the Internet, and/or private networks such as a secure enterprise private network.

In one example scenario, a style normalizing component 710 implementing techniques for normalizing the style of electronic messages may be part of the messaging application 701 or may be hosted elsewhere on system 700-A (e.g., at the OS level) and be callable via an application programming interface (API).

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. An API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. The API-calling component may be a local component (i.e., on the same data processing system as the API-implementing component) or a remote component (i.e., on a different data processing system from the API-implementing component) that communicates with the API-implementing component through the API over a network.

In another example implementation scenario, messaging application 701 running on a computing device 700-C, such as described with respect to system 600 of FIG. 6A, may communicate with style normalizing service 730 hosted on separate physical or virtual system 700-D, which may be embodied on a system such as described with respect to system 650 of FIG. 6B. Style normalizing service 730 may perform techniques for normalizing and transforming sender style formatting language (e.g., HTML) into recipient style formatting language. This language may then be communicated to messaging application 701 for further interpretation or rendering. Systems containing messaging application 701 and style normalizing service 730 may communicate with one another via API or other communication standard over network 720. They may also communicate with messaging service 725 for over network for further functionality, Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A method of normalizing message style for a recipient while preserving intent of a sender, the method comprising:
   receiving a message having a sender style from a sender;
   determining a discernable intent of the sender to emphasize a portion of content of the message, the determining of the discernable intent of the sender to emphasize the portion of content of the message comprising:
      identifying a first content with appearance modifiers throughout the message that satisfy a first criteria for default appearance modifiers, the first criteria comprising instances of a particular appearance modifier that occur over a specified threshold of instances and/or the particular appearance modifier that is assigned to an amount of content that meets or exceeds a specified percentage of total content; and
      from remaining content not satisfying the first criteria, identifying a second content satisfying a second criteria for sender-customized appearance modifiers, wherein identifying the second content comprises distinguishing between content in all caps and acronyms, wherein the second criteria is content with a discernable intent for indicating emphasis; and
   applying a normalized recipient style to the first content and applying an intent-preserving recipient style to the second content to generate a message view of the message that is consistent with a recipient style and that preserves the discernable intent of the sender to emphasize the portion of content, the recipient style comprising the normalized recipient style and the intent-preserving recipient style such that the acronyms remain capitalized and the content in all caps that are not the acronyms are identified as satisfying the second criteria, and wherein for at least one sender, the recipient style and the sender style are not equivalent.

2. The method of claim 1, wherein applying the normalized recipient style to the first content and applying the intent-preserving recipient style to the second content to generate the message view of the message in the recipient style that preserves the discernable intent of the sender comprises:
   replacing the default appearance modifiers according to the normalized recipient style; and
   replacing the sender-customized appearance modifiers according to the intent-preserving recipient style.

3. The method of claim 2, wherein replacing the default appearance modifiers and replacing the sender-customized appearance modifiers comprises:
   performing a lookup to determine a corresponding normalized appearance modifier for at least one default appearance modifier; and formatting the message using the corresponding normalized appearance modifier.

4. The method of claim 1, wherein the message comprises a conversation thread and a new section of content from the sender.

5. The method of claim 4, wherein the conversation thread comprises at least two different sender styles, wherein the message view is generated in the recipient style that preserves the discernable intent of the sender including discernable intent from within the conversation thread.

6. The method of claim 1, further comprising rendering the message view.

7. The method of claim 1, further comprising saving a recipient style message based on the message view to a messaging service.

8. A method of normalizing message style for a recipient while preserving intent of a sender, the method comprising:
receiving a first message having a sender style from a sender;
determining a discernable intent of the sender to emphasize a portion of content of the first message, the determining of the discernable intent of the sender to emphasize the portion of content of the first message comprising:
identifying a first content with appearance modifiers throughout the first message that satisfy a first criteria for default appearance modifiers, the first criteria comprising instances of a particular appearance modifier that occur over a specified threshold of instances and/or the particular appearance modifier that is assigned to an amount of content that meets or exceeds a specified percentage of total content; and
from remaining content not satisfying the first criteria, identifying a second content satisfying a second criteria for sender-customized appearance modifiers, wherein identifying the second content comprises distinguishing between content in all caps and acronyms, wherein the second criteria is content with a discernable intent for indicating emphasis;
assigning a marker for at least an instance of the second content;
replacing the sender style for content not assigned with the marker with a normalized recipient style in the first message, wherein, for at least one sender, the sender style and the normalized recipient style are not equivalent; and
replacing the sender style for content assigned with the marker with an intent-preserving recipient style in the first message such that the acronyms remain capitalized and the content in all caps that are not the acronyms are identified as satisfying the second criteria, wherein, for at least one sender, the sender style and the intent-preserving recipient style are not equivalent.

9. The method of claim 8, wherein the intent-preserving recipient style comprises a user-selected formatting element to indicate emphasis.

10. The method of claim 8, wherein the first message comprises a conversation thread.

11. The method of claim 10, wherein the conversation thread comprises a first conversation having a first sender style and a second conversation having second sender style, wherein determining the discernable intent of the sender to emphasize the portion of content comprises determining the discernable intent to emphasize the portion of content for the first conversation separately from determining the discernable intent to emphasize the portion of content for the second conversation.

12. The method of claim 11, further comprising:
replacing the first sender style for content not assigned with the marker with a normalized recipient style in the first message;
replacing the second sender style for content not assigned with the marker with the normalized recipient style in the first message; and
replacing the portion of content from the first conversation and the portion of content from the second conversation with an intent-preserving recipient style in the first message.

13. The method of claim 8, further comprising:
receiving a second message from a second sender and having a second sender style different than the sender style of the first message;
determining a discernable intent of the second sender to emphasize a portion of content of the second message; and
assigning the marker for at least an instance of the portion of content from the second message.

14. An apparatus comprising:
one or more computer readable storage media;
one or more processors; and
a messaging application embodied in program instructions stored on the one or more computer readable storage media that, when executed by the one or more processors, direct the one or more processors to:
receive a message having a sender style from a sender;
determine a discernable intent of the sender to emphasize a portion of content of the message, the determining of the discernable intent of the sender to emphasize the portion of content of the message comprising:
identify a first content with appearance modifiers throughout the message that satisfy a first criteria for default appearance modifiers, the first criteria comprising instances of a particular appearance modifier that occur over a specified threshold of instances and/or the particular appearance modifier that is assigned to an amount of content that meets or exceeds a specified percentage of total content; and
from remaining content not satisfying the first criteria, identifying a second content satisfying a second criteria for sender-customized appearance modifiers, wherein identifying the second content comprises distinguishing between content in all caps and acronyms, wherein the second criteria is content with a discernable intent for indicating emphasis;
apply a normalized recipient style to the first content and applying an intent-preserving recipient style to the second content to generate a message view of the message that is consistent with a recipient style and that preserves the discernable intent of the sender to emphasize the portion of content, the recipient style comprising the normalized recipient style and the intent-preserving recipient style such that the acronyms remain capitalized and the content in all caps that are not the acronyms are identified as satisfying the second criteria, and wherein, for at least one sender, the recipient style and the sender style are not equivalent; and
render the message view.

15. The apparatus of claim 14, wherein the message view replaces the default appearance modifiers of the sender style with the normalized recipient style and replaces the sender-customized appearance modifiers according to the intent-preserving recipient style.

16. The apparatus of claim 14, further comprising:
a lookup table or database stored on at least one of the one or more computer readable storage media, the lookup table or database containing information providing a correspondence between an appearance modifier associated with the sender style and a normalized appearance modifier of the recipient style.

17. The apparatus of claim 14, further comprising:
a lookup table or database stored on at least one of the one or more computer readable storage media, the lookup table or database containing information providing a correspondence between a first marker indicating a default appearance modifier associated with the sender style and a normalized appearance modifier of the recipient style and a correspondence between a second marker indicating a sender-customized appearance modifier and an intent-preserving recipient style appearance modifier.

18. The method of claim 1, wherein the recipient style is based on recipient settings selected by the recipient in a user interface.

19. The method of claim 1, wherein the recipient style minimizes an amount of font faces, font sizes, and font colors used in the message for the recipient.

* * * * *